UNITED STATES PATENT OFFICE

BRUNO UEBLER, OF BERLIN, GERMANY

RECOVERY OF CHLORINE FROM GAS MIXTURES

No Drawing. Original application filed June 17, 1929, Serial No. 371,707, and in Germany September 17, 1927. Divided and this application filed October 17, 1930. Serial No. 487,023.

This application is a division of U. S. patent application Ser. No. 371,707, filed June 17, 1929, and has been filed in Germany, September 17, 1927.

My invention refers to the production of nitrates and has for its particular object to produce nitrates from chlorides and nitric acid or nitrous gases without losing any nitrogen.

In the production of nitrates on a big scale the starting material must be readily available and therefore nitrous gases or nitric acid on the one hand and metal chlorides, more especially potassium chloride, on the other hand are used for this purpose. All the processes hitherto devised, however, do not pay sufficient attention to the losses of nitrogen arising in the reactions. In order to exclude any such losses, the reaction $$KCl + HNO_3 = KNO_3 + HCl \quad (I)$$

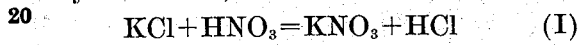

must take place quantitatively in such manner that all the chlorine escapes in the form of hydrochloric acid or that according to the reaction $$HNO_3 + 3HCl = 2H_2O + NO + 3Cl \quad (II)$$

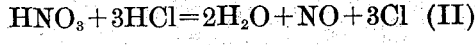

all the chlorine escapes as such, without any nitrogen oxide being lost.

In reality, however, the reaction II as a rule occurs differently, viz.

$$HNO_3 + 3HCl = 2H_2O + NOCl + 2Cl \quad (IIa)$$

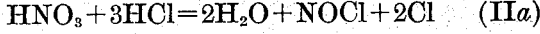

nitrosyl chloride being formed. The difficulty of separating Cl from NO rendered all prior processes uncommercial.

I have now found that this separation can be effected in the following manner: If the gas mixture is cooled down to a low temperature, NOCl is liquefied and can be separated as a liquid from the chlorine, which has a lower boiling point. I may however, also heat the gas mixture first to a higher temperature and thereafter cool it down quickly to a low temperature under supply of air. I then obtain a mixture of $NO_2$ and Cl, which can be separated by liquefaction in the cold and fractional distillation, the chlorine escaping first.

*Example*

The gas mixture obtained by acting with nitric acid on potassium chloride, such mixture consisting of 9.5% nitrosyl chloride, 17.5% chlorine and 73% nitrogen, is cooled down to $-60°$ C., in order to altogether remove the nitrosyl chloride from the inert gases. There separates out a liquid mixture composed of approximately equal parts of nitrosyl chloride and chlorine. The inert gases, which escape, are washed with small quantities of water, in order to remove the last traces of nitrosyl chloride and can moreover be conducted with great success over ferric chloride. The liquefied gas mixture is subjected to fractional distillation at about $-30°$ C. In the distillation almost exclusively chlorine escapes, containing only a low percentage of NOCl. This latter is quantitatively removed when the gases are conducted over ferric chloride.

Various changes may be made in the details disclosed in the foregoing specification without departing from the invention or sacrificing the advantages thereof.

Throughout the specification and the claim affixed thereto the expressions "liquefaction", "liquefied gas" and "liquid gas" are intended to refer to the production of the gas as such in the liquid phase, as distinguished from mere solutions of the gas or compounds thereof in ordinary solvents, such as water and the like.

I claim:—

In the process of producing alkali nitrates from alkali chlorides and nitric acid or nitrous gases the steps which comprise separating from the mixture of chlorine and nitrosyl chloride formed in the reaction of the major quantity of the free chlorine by thermic decomposition and quick cooling down of the mixture, through which air is passed, until complete liquefaction of $NO_2$ and $Cl_2$ has taken place, and subjecting the liquefied gas to fractional distillation.

In testimony whereof I affix my signature.

BRUNO UEBLER.